United States Patent [19]
Cho

[11] Patent Number: 6,016,022
[45] Date of Patent: Jan. 18, 2000

[54] ELECTRICITY GENERATING SYSTEM FOR BICYCLE

[76] Inventor: Kunlin Cho, 17 Alley 1, Lane 43, Tapeng Rd., Taichung, Taiwan

[21] Appl. No.: 09/027,795

[22] Filed: Feb. 23, 1998

[51] Int. Cl.[7] .................................................. H02K 7/10
[52] U.S. Cl. .......................................... 310/75 C; 290/1 R
[58] Field of Search ..................... 310/75 C; 290/1 R, 290/1 C; 322/1

[56] References Cited

U.S. PATENT DOCUMENTS

| | | | |
|---|---|---|---|
| 3,626,227 | 12/1971 | Ritsema | 310/168 |
| 4,366,922 | 1/1983 | Levine et al. | 224/414 |
| 5,015,869 | 5/1991 | Schürmann et al. | 290/1 R |
| 5,360,103 | 11/1994 | Loosli | 198/844.2 |

*Primary Examiner*—Nestor Ramirez
*Assistant Examiner*—Judson H. Jones
*Attorney, Agent, or Firm*—Connolly Bove Lodge & Hutz

[57] ABSTRACT

An electricity generating system for driving one dynamo or several dynamos on a bicycle, the electricity generating system comprising: a driving wheel, concentric with one of the bicycle wheels, surrounding the hub thereof and performing a rotating movement along with the bicycle wheel; a support, mounted on the frame and carrying the dynamos, with a holding plate holding the dynamos; and a conveyor belt for driving drive wheels on the dynamos by the rotating movement of the driving wheel, so as to generate electricity. The driving mechanism reduces the mechanical force necessary to drive the dynamos and allows to install additional lamps or devices, thus increasing safety and making cycling more convenient.

2 Claims, 7 Drawing Sheets

ELECTRICITY GENERATING SYSTEM FOR BICYCLE

BACKGROUND OF THE INVENTION

1. Field of the Invention

The present invention relates to an electricity generating system for a bicycle, particularly to an electricity generating system for a bicycle with reduced retardation and higher generation of electricity, which allows for cycling without extra effort and the installation of additional lamps for better safety.

2. Description of Related Art

Figure 1:
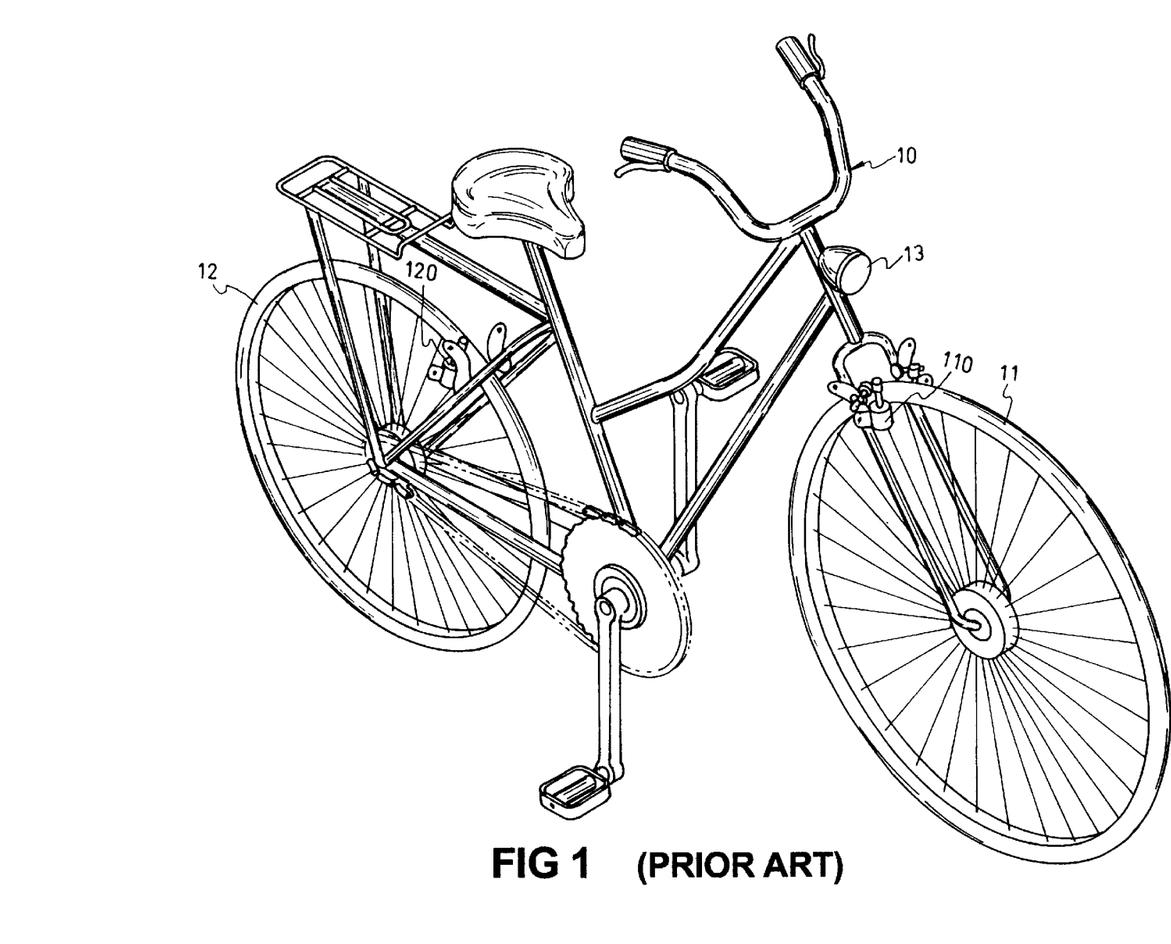
FIG. 1 is a schematic illustration of conventional dynamos on a bicycle.
Figure 2:
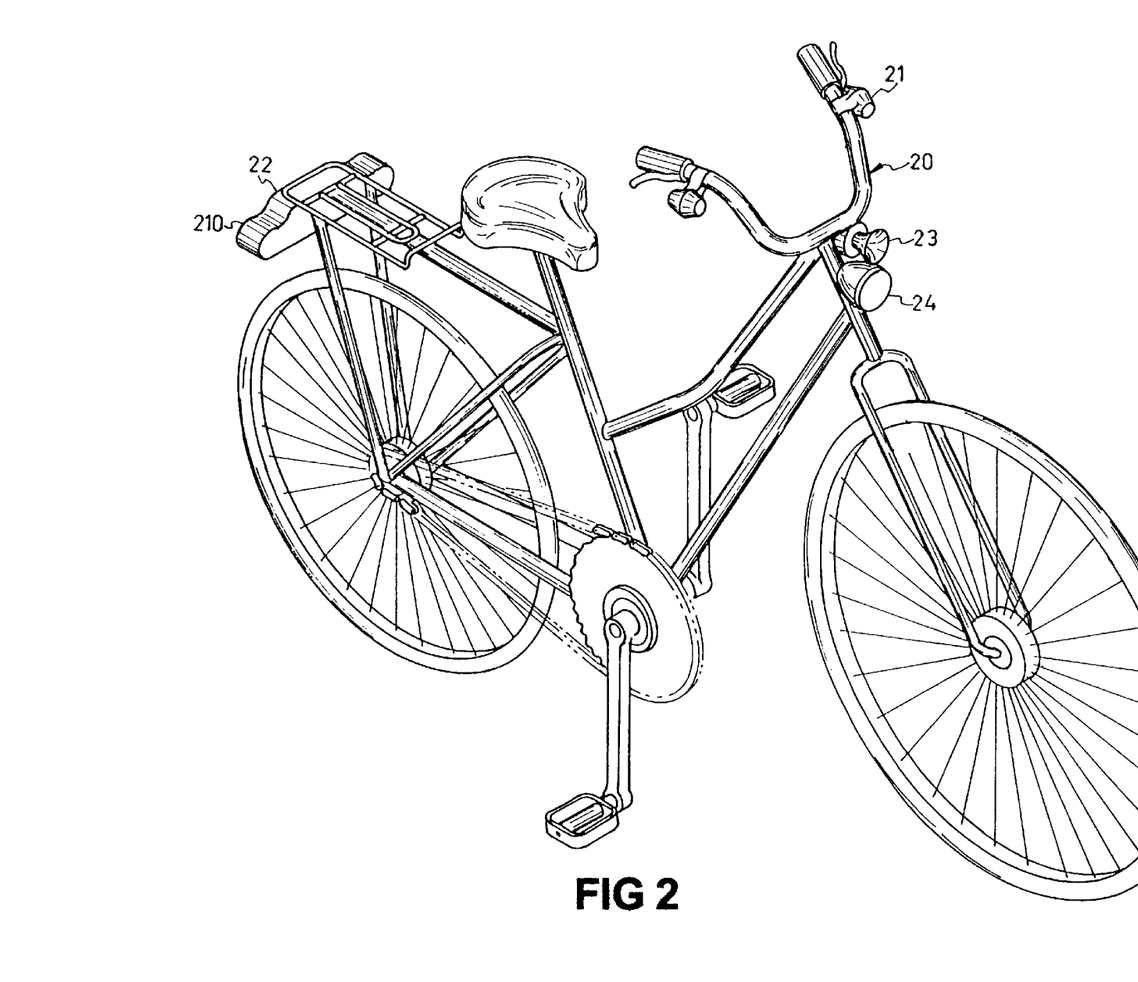
FIG. 2 is a schematic illustration of the electricity generating system of the present invention on a bicycle.

For generating electricity, a conventional bicycle 10 with a front wheel 11 and a rear wheel 12, as shown in FIG. 1, has a dynamo 110, which is driven by the front wheel 11, or a dynamo 120, which is driven by the rear wheel 12. Electricity thereby generated feeds a lamp 13. Operating the dynamo 110 or 120, however, has a retarding effect on the movement of the bicycle, so two or more dynamos to generate more electricity cannot be installed practically. Since the dynamos 110, 120 are connected to the rims of the front and rear wheels 11, 12, even a small retarding force from the dynamo 110,120 there has a requires considerably more mechanical force by the cyclist to be overcome. At the same time less electricity is generated, and the lamp 13 is not properly fed, leading to reduced safety. These problems have made bicycles a less attractive means for transport and exercise.

SUMMARY OF THE INVENTION

An object of the present invention is to provide an electricity generating system for a bicycle with reduced retardation, which is installed close to the hubs of one of the bicycle wheels and thus close to the axis of rotation, such that the retarding force thereof has minimum effect on the front wheel and the generation of electricity requires minimum mechanical force.

Another object of the present invention is to provide an electricity generating system for a bicycle with increased electricity generation, allowing for more lamps and devices, like indicator lights or a horn, to be installed for increased safety.

BRIEF DESCRIPTION OF THE DRAWINGS

The present invention can be more fully understood, by way of example, with reference to the following accompanying drawings, in which.

DETAILED DESCRIPTION OF THE PREFERRED EMBODIMENTS

Figure 3:
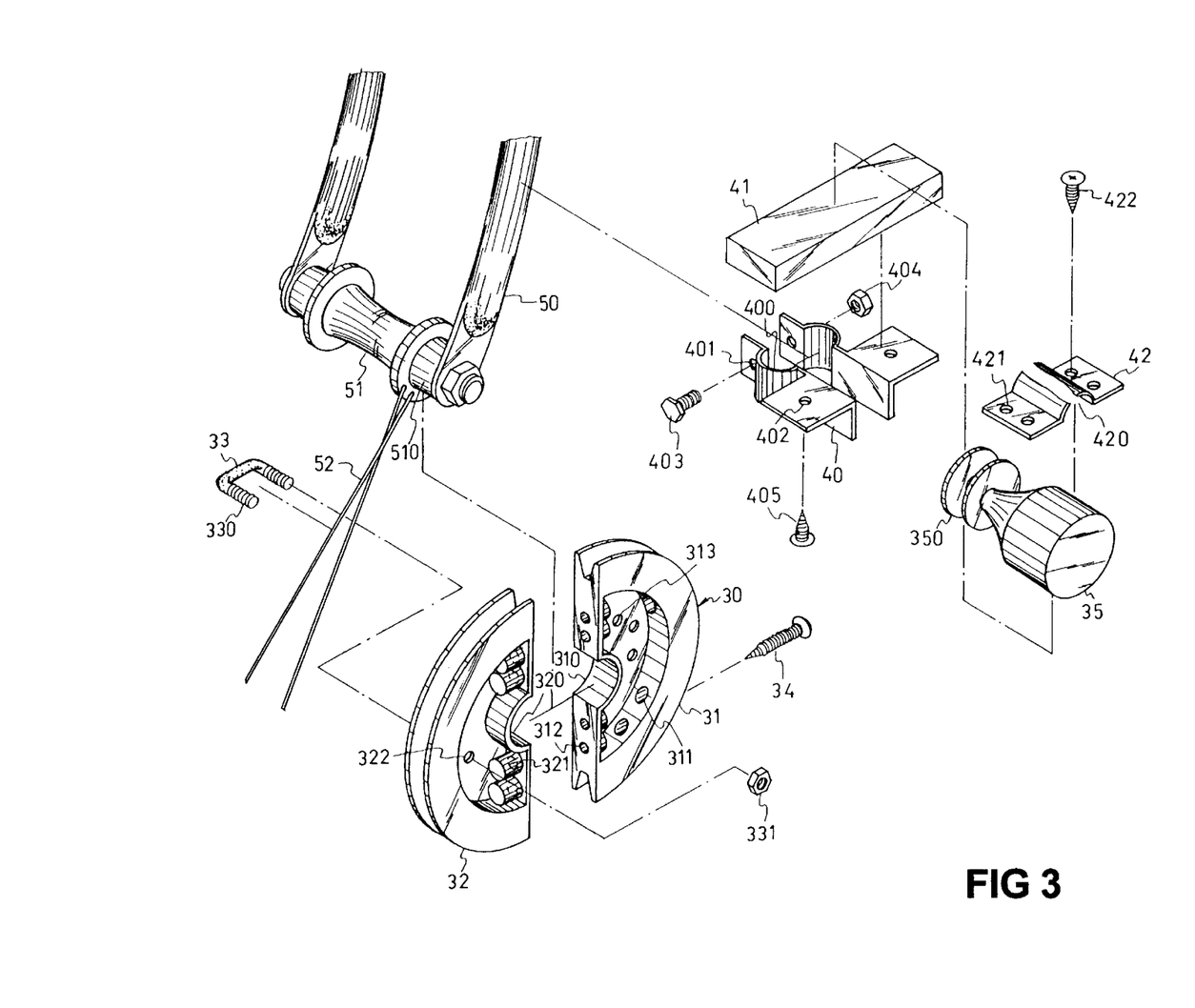
FIG. 3 is an exploded perspective view of the electricity generating system for a bicycle of the present invention in the first embodiment.
Figure 4:
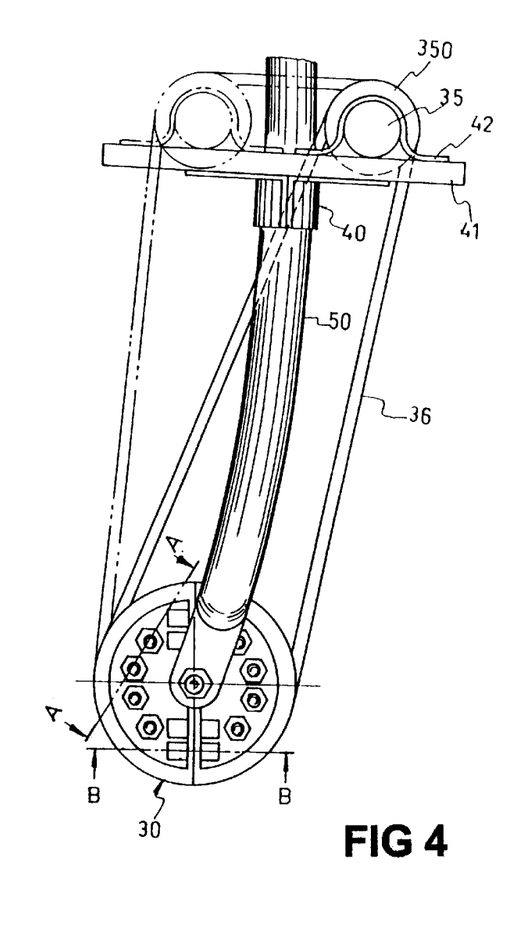
FIG. 4 is a perspective view of the electricity generating system for a bicycle of the present invention in the first embodiment, when installed.

As shown in FIGS. 3 and 4, the electricity generating system of the present invention is used for a bicycle with forks 50 and a front hub 51 with center hubs, holding spokes 52, and spaces 510 between the center hubs and the forks 50. Electricity is generated by a dynamo 35. The electricity generating system for a bicycle of the present invention has a driving wheel 30, which surrounds the front hub 51 of the bicycle, close to the forks 50. The driving wheel 30 comprises a right half-wheel 31 and a left half-wheel 32, which are of equal sizes and each have a semicircular rim and an interface. The right and left half-wheels 31, 32 are separately put on the front hub 51 with the interfaces next to each other and thus are mounted without any need to remove the front hub 51 from the forks 50.

Figure 4A:
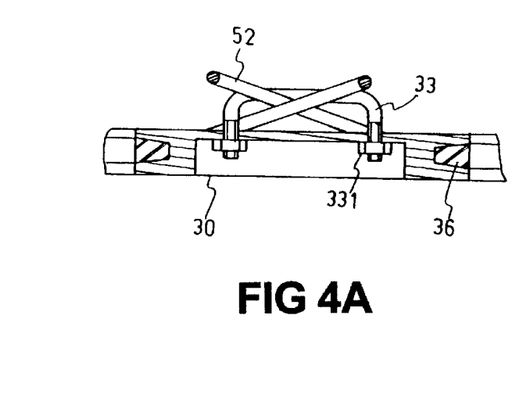
FIG. 4A is a sectional view along line AA in FIG. 4.
Figure 4B:
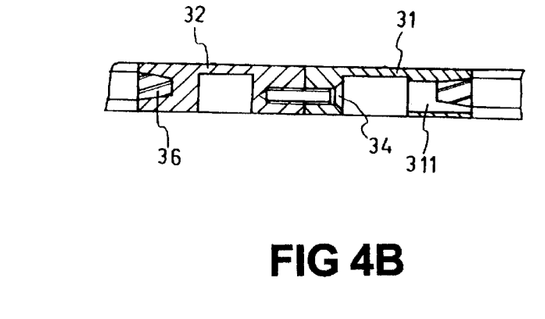
FIG. 4B is a sectional view along line BB in FIG. 4.

The right and left half-wheels 31, 32 form semi-circles with centers that have semicircular recesses 310, 320, respectively. When the right and left half-wheels 31, 32 are mounted, with the interfaces contacting each other, the recesses 310, 320 surround one of the spaces 510 on the front hub 51. The first half-wheel 31 has several holes 311 on the rim and several holes 312 on the interface, allowing to put through screws 34 for connecting the right and left half-wheels 31, 32. The screws 34 are held by threaded holes 321 on the interface of the left half-wheel 32 (as shown in FIG. 4B). The driving wheel 30 is further held together by at least a U-shaped pin 33 with two legs and threads 330 thereon. The U-shaped pin 33 encloses a pair of spokes 52. One leg thereof passes through a hole 313 in the right half-wheel 31, and one leg passes through a neighboring hole 313 in the right half-wheel 31, both legs being secured by nuts 331 (as shown in FIG. 4A, the sectional view A—A of FIG. 4). Holes 322 in the left half-wheel 32 are also provided for locating more U-shaped pins 33.

A support 40 is fastened to the forks 50 on the side of the driving wheel 30. The support 40 has a pipe clip 400 consisting of two halves with aligned holes 401 on both halves. The pipe clip 400 surrounds the forks 50 and is held by a screw 403 put through the holes 401 and a nut 404. Horizontal surfaces are attached to both halves of the pipe clip 400. A hole 402 is bored into each of the horizontal surfaces. Screws 405 pass through the holes 402 to hold a connecting plate 41, which rests on the support 40. The connecting plate 41 carries the dynamo 35. A clip 42 with a middle arc 420 holds the dynamo 35 on the connecting plate 41. Screws 422, passing through holes 421 in the clip 42 secure the dynamo 35.

The dynamo 35 has a drive wheel 350. A conveyor belt 36 transmits the rotation of the driving wheel 30 to the drive wheel 350, causing the dynamo 35 to generate electricity. A fixed transmission path of mechanical force ensures that there is little retardation, allowing to employ more dynamos 35 to generate more electricity.

Figure 5:
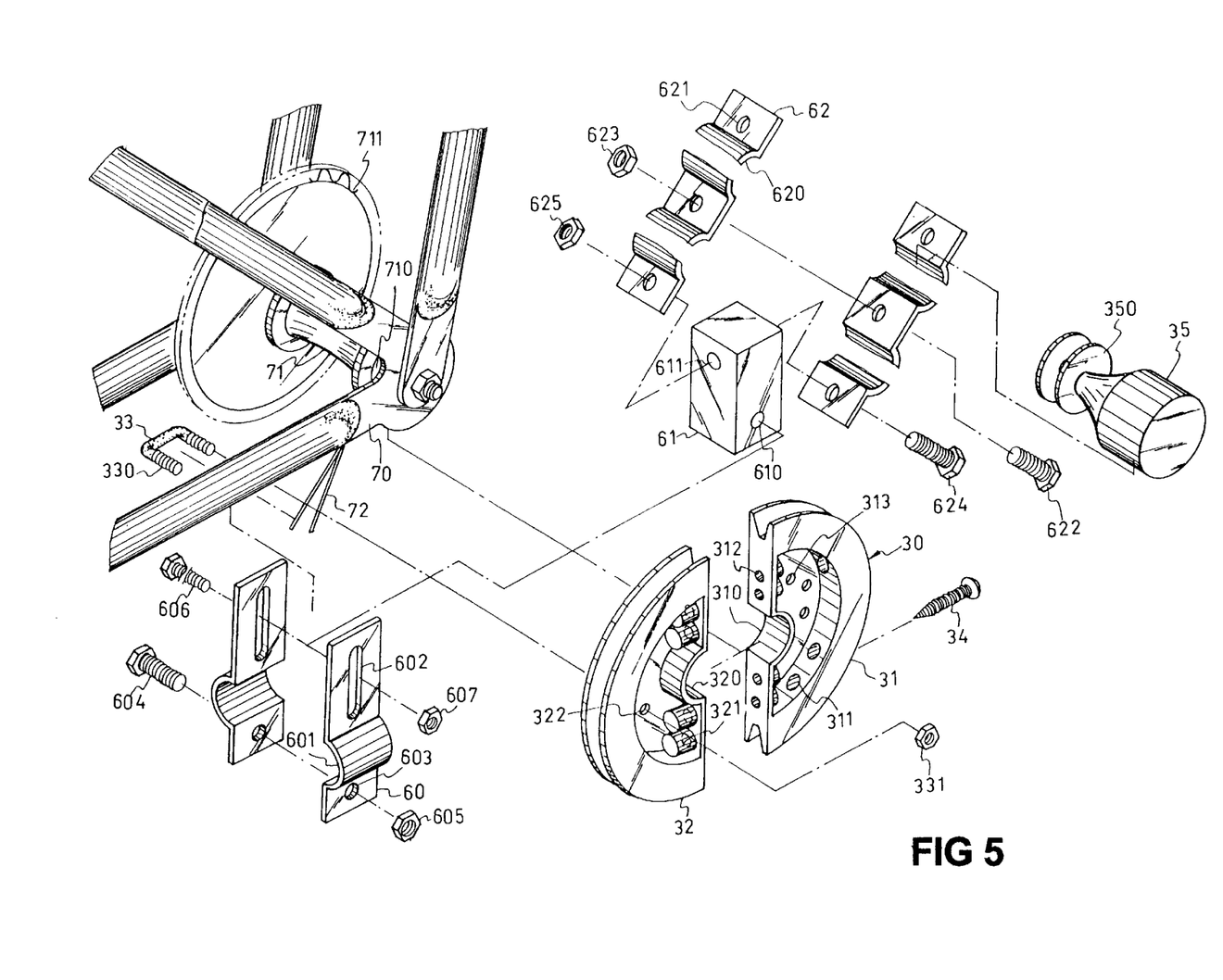
FIG. 5 is an exploded perspective view of the electricity generating system for a bicycle of the present invention in the second embodiment.
Figure 6:
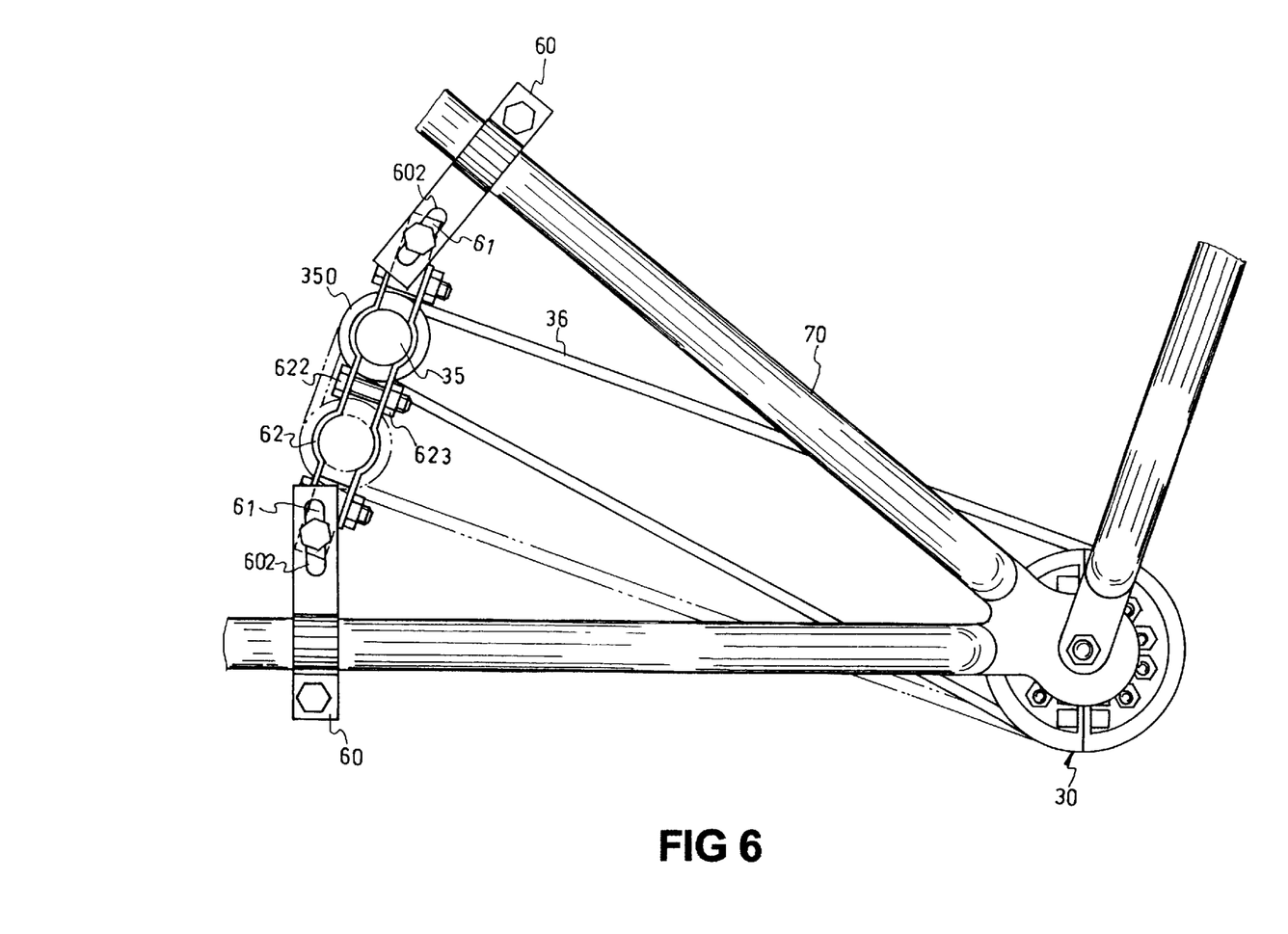
FIG. 6 is a perspective view of the electricity generating system for a bicycle of the present invention in the second embodiment, when installed.

Referring to FIGS. 5 and 6, the electricity generating system for a bicycle of the present invention in a second embodiment is installed on the rear wheel of the bicycle, which has seat stays and chain stays 70 and a rear hub 71 with a sprocket 711 and central hubs, holding spokes 72. A space 710 lies between the central hub 710 that is away from the sprocket 711 and one of the seat stays and chain stays 70. In the second embodiment of the present invention, the driving wheel 30 surrounds the rear hub 71 at the space 710. The U-shaped pin 33 encloses a pair of the spokes 72.

In the second embodiment of the present invention, a support 60 carries one dynamo 35 or several dynamos 35. The support 60 has a pipe clip 601 consisting of two symmetric halves with aligned holes 603. The pipe clip 601 surrounds one of the seat stays or chain stays 70 and is held by a screw 604 put through the holes 603 and a nut 605. The support further has two aligned elongated holes 602 on the two halves of the pipe clip 601. A screw 606 passes through the elongated holes 602, secured by a nut 607, to hold a connecting block 61 at an adjustable position. The connecting block 61 has a hole 610 to be held on the support 60 and a hole 611 to connect to two clips 62. The clips 62 each have several middle arcs 620, which hold the dynamos 35 from two sides. The clips 62 are further provided with holes 621 to be fastened to each other by screws 622 and nuts 623 as well as to the connecting block 61 by a screw 624 and a nut 625. The conveyor belt 36 transmits the rotation of the driving wheel 30 to the drive wheel 350, causing the dynamos 35 to generate electricity. As needed, one or several dynamos 35 are employed to generate electricity.

Figure 7:
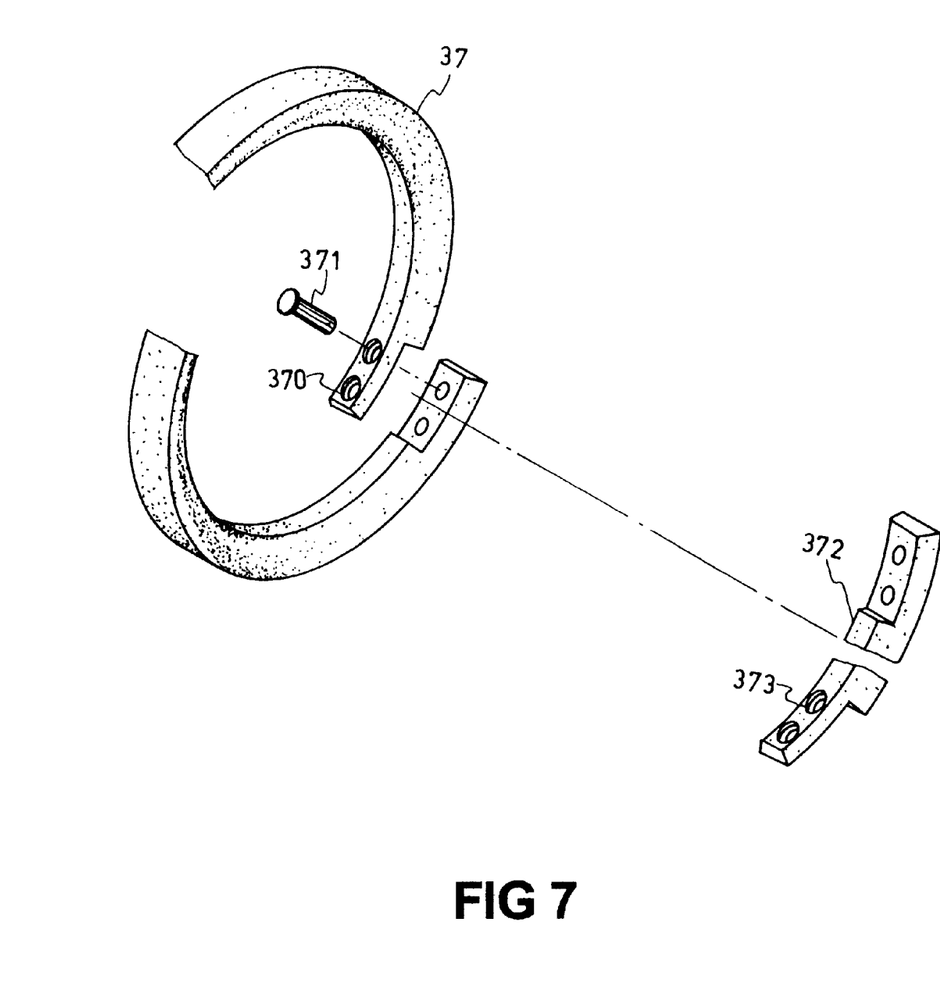
FIG. 7 is a perspective view of the conveyor of the present invention in the third embodiment.

To allow for convenient switching between one or several dynamos 35, the present invention in a further embodiment has a conveyor belt 37 of adjustable length, which does not need any dismounting of the bicycle for adjusting the length. Referring to FIG. 7, the conveyor belt 37 has two ends, which are connected by bolts 371 at holes 370. To extend the length of the conveyor belt, an extension belt 372 is inserted between the ends of the conveyor belt 37 and fastened thereto at holes 373. The position of the dynamos 35 is fine-adjusted to the length of the conveyor belt 37 by fastening the connecting block 61 at an appropriate position on the elongated holes 602.

While the invention has been described with reference to preferred embodiments thereof, it is to be understood that modifications or variations may be easily made without departing from the spirit of this invention which is defined by the appended claims.

I claim:

1. An electricity generating system on a bicycle with forks, a bicycle wheel and a front hub with spokes on said bicycle wheel, comprising:

a driving wheel surrounding said front hub and performing a rotating movement along with said bicycle wheel;

a support, mounted on said fork with a connecting plate;

at least a dynamo with a drive wheel, being held by said connecting plate; and a conveyor belt, enclosing said driving wheel and said at least a dynamo, driving said at least a dynamo via said rotating movement so as to generate electricity;

characterized in that said driving wheel further comprising a first half-wheel, having a first semicircular rim with a plurality of transverse holes, a first interface with a plurality of transverse holes aligning with said transverse holes on said rim, a first central semicircular recess surrounding said front hub, and at least two spaced radial holes between said first rim and said first recess;

a second half-wheel, being opposite to said first half-wheel, having a second semicircular rim, a second interface with transverse threaded holes corresponding to said transverse holes on said first half-wheel, a second central semicircular recess surrounding said front hub to allow said first and second interfaces contacting each other, and at least two spaced radial holes between said second rim and said second recess;

a plurality of screws, passing through said transverse holes and secured to said transverse threaded holes; and at least a U-shaped pin, said U-shaped pin enclosing a pair of said spokes and having two legs with threads, said legs passing through said two spaced radial holes on said first half-wheel or on said second half-wheel, and being secured by a nut respectively;

said support further comprising two opposite pipe clip halves, surrounding said forks and fastened to each other on said forks, each of said clips being fastened to said connecting plate, and at least a clip with middle arc, being attached on said connecting plate to hold said dynamo.

2. An electricity generating system on a bicycle with seat stays, a bicycle wheel and a rear hub with spokes on said bicycle wheel, comprising:

a driving wheel surrounding said rear hub and performing a rotating movement along with said bicycle wheel;

a support, mounted on said stays with two opposite clips;

at least a dynamo with a drive wheel, being held by said two clips; and each of said two clips having a plurality of middle arc for holding said dynamo; and two connecting blocks, each of said two connecting blocks being adjustably attached to said two pipe clips respectively, and being fastened to said two clips respectively;

a conveyor belt, enclosing said driving wheel and said drive wheel on at least said dynamo, driving at least said dynamo via said rotating movement so as to generate electricity;

characterized in that said driving wheel further comprising a first half-wheel, having a first semicircular rim with a plurality of transverse holes, a first interface with a plurality of transverse holes aligning with said transverse holes on said first rim, a first central semicircular recess surrounding a front hub, and at least two spaced radial holes between said first rim and said first recess;

a second half-wheel, being opposite to said first half-wheel, having a second semicircular rim, a second interface with transverse threaded holes corresponding to said transverse holes on said first half-wheel, a second central semicircular recess surrounding said front hub to allow said first and second interfaces contacting each other, and at least two spaced radial holes between said second rim and said second recess;

a plurality of screws, passing through said transverse holes and secured to said transverse threaded holes; and at least a U-shaped pin, said U-shaped pin enclosing a pair of said spokes and having two legs with threads, said legs passing through said two spaced radial holes on said first half-wheel or on said second half-wheel, and being secured by a nut respectively;

said support further comprising each of said two clips having a plurality of middle arc for holding at least said dynamo;

two connecting block, each of said two connecting blocks being fastened to said two clips respectively at both ends thereof; and two pair of opposite pipe clip halves, each pair of said pipe clips halves surrounding one of said stays respectively and fastened to each other, each of said pipe clips having an elongated hole for adjustably engaging with said two connecting blocks respectively.

* * * * *